United States Patent
Hunt

(10) Patent No.: US 7,222,499 B2
(45) Date of Patent: May 29, 2007

(54) CLOSED LOOP AIR CONDITIONING SYSTEM

(75) Inventor: Richard Grant Hunt, Yeovil (GB)

(73) Assignee: Honeywell Normalair Garrett (Holdings), Somerset (GB)

( * ) Notice: Subject to any disclaimer, the term of this patent is extended or adjusted under 35 U.S.C. 154(b) by 193 days.

(21) Appl. No.: 11/156,802

(22) Filed: Jun. 20, 2005

(65) Prior Publication Data
US 2007/0006607 A1 Jan. 11, 2007

(30) Foreign Application Priority Data
Jun. 26, 2004 (GB) ................. 0414341.8

(51) Int. Cl.
*F25D 9/00* (2006.01)
(52) U.S. Cl. .................................... 62/402
(58) Field of Classification Search ............ 62/86, 62/87, 172, 401, 402, 434; 60/266, 269, 60/767; 165/104.33; 454/71, 76
See application file for complete search history.

(56) References Cited
U.S. PATENT DOCUMENTS

| | | | | |
|---|---|---|---|---|
| 3,494,145 A | * | 2/1970 | Hunt et al. ............... | 62/402 |
| 4,476,674 A | * | 10/1984 | Berman .................... | 60/39.182 |
| 4,553,407 A | | 11/1985 | Rannenberg et al. | |
| 5,121,610 A | | 6/1992 | Atkinson et al. | |
| 5,151,022 A | * | 9/1992 | Emerson et al. ......... | 423/245.3 |
| 5,343,692 A | * | 9/1994 | Thomson et al. ............. | 60/785 |
| 5,373,707 A | * | 12/1994 | Ostersetzer et al. ......... | 62/401 |
| 6,164,084 A | * | 12/2000 | Watson et al. .............. | 62/402 |
| 6,295,822 B1 | * | 10/2001 | Mueller ..................... | 62/172 |
| 6,415,595 B1 | * | 7/2002 | Wilmot et al. ............. | 60/785 |
| 6,457,318 B1 | | 10/2002 | Lui et al. | |
| 6,505,474 B2 | * | 1/2003 | Sauterleute et al. ......... | 62/172 |
| 6,526,775 B1 | * | 3/2003 | Asfia et al. ................... | 62/402 |
| 6,595,010 B2 | * | 7/2003 | Sauterleute et al. ........... | 62/86 |
| 6,615,606 B2 | * | 9/2003 | Zywiak ..................... | 62/402 |
| 6,966,198 B2 | * | 11/2005 | Piccirilli et al. ............. | 62/402 |

FOREIGN PATENT DOCUMENTS

| | | | |
|---|---|---|---|
| EP | 0248578 A2 | * | 12/1987 |
| EP | 1295789 A2 | | 3/2003 |
| GB | 2242261 A | | 9/1991 |
| GB | 2 273 349 A | | 6/1994 |

* cited by examiner

*Primary Examiner*—Mohammad M. Ali
(74) *Attorney, Agent, or Firm*—Arnold B. Silverman; Eckert Seamans Cherin & Mellot, LLC

(57) ABSTRACT

A closed loop air conditioning system for an aircraft includes a compressor stage including at least one power driven compressor, for compressing working fluid, a first expansion turbine over which compressed working fluid is expanded and cooled, a first heat load heat exchanger in which heat from a first heat load is exchanged to the expanded and cooled working fluid, a second expansion turbine over which working fluid from the first heat exchanger is further expanded and cooled, and a second heat load heat exchanger in which heat from a second heat load is exchanged to the further expanded and cooled working fluid.

24 Claims, 3 Drawing Sheets

CLOSED LOOP AIR CONDITIONING SYSTEM

BACKGROUND TO THE INVENTION

This invention relates to a closed loop air conditioning system for an aircraft. By "closed loop" we mean that a working fluid is conditioned and recirculated, and used to cool a heat load such as the air in an aircraft cabin, or the air in an environment including a heat load such as an avionics system of the aircraft, or otherwise.

DESCRIPTION OF THE PRIOR ART

Previously hot compressed air from a gas turbine engine has been bled off from the engine and used as a source of air for an aircraft air conditioning system, usually in an open loop air conditioning system in which at least a proportion of the bleed air has after conditioning, been provided to the aircraft cabin or to an avionics heat load for examples, to effect direct cooling and after use, at least some of which is discarded. The use of turbomachinery in such a system is a well developed and reliable technology.

However, in more modern aircraft engines, it is undesirable to bleed off air as this introduces unacceptable losses of efficiency. Thus for more modern aircraft designs, greater emphasis has been placed on using the aircraft engine or engines, to generate electricity, which may be used to power aircraft systems.

SUMMARY OF THE INVENTION

According to a first aspect of the invention we provide a closed loop air conditioning system for an aircraft, the system including a compressor stage including at least one power driven compressor, for compressing working fluid, a first expansion turbine over which compressed working fluid is expanded and cooled, a first heat load heat exchanger in which heat from a first heat load is exchanged to the expanded and cooled working fluid, a second expansion turbine over which working fluid from the first heat exchanger is further expanded and cooled, and a second heat load heat exchanger in which heat from a second heat load is exchanged to the further expanded and cooled working fluid.

The invention enables a closed loop system, in which the power driven compressor may be electrically driven by a motor, advantageously to be used in an aircraft. By providing a closed loop rather than open loop system, the working fluid may be kept separate from air which may be breathed thus avoiding contamination of such breathing air by foreign or bacterial matter which may reside in system passageways.

The compressor stage may be a single compressor or multiple compressors, but in the case of multiple compressors, one of the compressors may be driven by the rotation of the first expansion turbine or the second expansion turbine.

Desirably, an intercooler for cooling compressed working fluid prior to its expansion, is provided.

The intercooler may include a heat exchanger through which ambient air is constrained to pass to cool the hot compressed working fluid. The ambient air may be ram air i.e. air which passes through the heat exchanger as a result of movement of the aircraft through the air, or the intercooler may include a fan which is driven to draw air or force air through the intercooler heat exchanger to cool the hot compressed working fluid, so that the ambient air may be constrained to flow through the heat exchanger whilst the aircraft is on the ground.

Such a fan, where provided, may be electrically driven, or may be carried on a shaft with which the first expansion turbine over which the compressed working fluid is expanded and cooled, rotates.

If desired, the system may include a by-pass valve arrangement which is operative to permit at least a proportion of the hot compressed working fluid from the compressor stage to by-pass the first heat exchanger and pass directly to the second expansion turbine as required. The provision of such a valve arrangement permits the system to be operated by a controller according to a control algorithm, for maximum efficiency and/or to ensure preferential cooling of the second heat load for example.

Where the compressor stage includes at least two compressors, the system may include an intermediate heat exchanger between two compressors for cooling compressed working fluid in the compressor stage prior to its final compression. In this case, preferably the or an upstream compressor is carried on a shaft with which the second expansion turbine over which the compressed working fluid is expanded and cooled, rotates, and the or a downstream compressor is the power driven compressor.

Coolant for the intermediate heat exchanger, to which heat is exchanged from the compressed working fluid, may be working fluid which has been expanded and cooled by the first expansion turbine. In this case preferably the working fluid from the first expansion turbine first cools the first heat load in the first heat load heat exchanger before being used as coolant in the intermediate heat exchanger. The coolant from the intermediate heat exchanger may then be passed to the second expansion turbine for further expansion and cooling.

In an alternative arrangement, coolant for the intermediate heat exchanger, to which heat is exchanged from the compressed working fluid, may be heat load air e.g. aircraft cabin air or air from an avionics environment, preferably after cooling in first heat exchanger so that the heat load air is cooler than the compressed working fluid. After being used as a coolant in the intermediate heat exchanger, the heat load air may be recirculated to the aircraft cabin or avionics environment, if desired, after being cooled downstream of the second expansion turbine as a second heat load, in the second heat load heat exchanger.

In another arrangement, coolant for the intermediate heat exchanger, to which heat is exchanged from the compressed working fluid, may be ambient air which has been cooled in first heat exchanger, which ambient air coolant may be discharged from aircraft or otherwise used, after cooling the hot compressed air in the intermediate heat exchanger.

The system may include in series with the intercooler, a regenerative heat exchanger to which a coolant is supplied further to cool the compressed working fluid which has been cooled in the intercooler, from the first expansion turbine, prior to the working fluid passing to the second expansion turbine for further expanding and cooling. Prior to being used as a coolant in the regenerative heat exchanger, the working fluid from the first expansion turbine may be used as a coolant in the first heat load heat exchanger.

In an embodiment of the invention applied to an air conditioning system for cooling cabin air in an aircraft and where it is desirable to mix with re-circulating cabin air a proportion of fresh supply air, the supply air may be the first heat load which is cooled in the first heat load heat exchanger, and which is then mixed with re-circulating cabin air, the cabin air, prior to mixing with the supply air, being a second heat load which is cooled in the second heat load heat exchanger by the working fluid from the second expansion turbine.

According to a second aspect of the invention we provide an aircraft having an air conditioning system according to the first aspect of the invention.

BRIEF DESCRIPTION OF THE DRAWINGS

Various embodiments of the invention will now be described with reference to the accompanying drawings in which.

DESCRIPTION OF THE PREFERRED EMBODIMENTS

Figure 1:
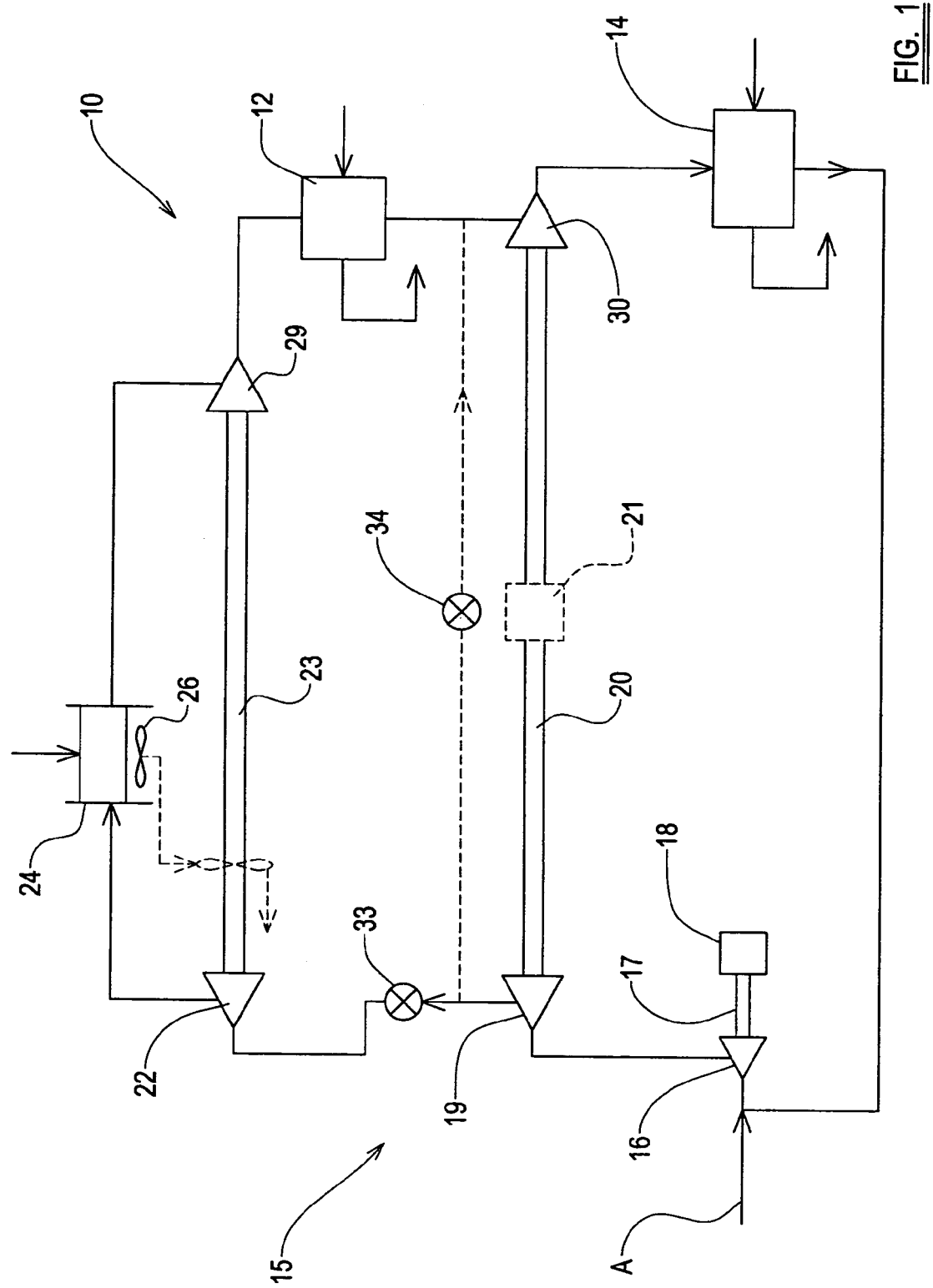
FIG. 1 is a diagrammatic illustration of a first embodiment of the invention.

Referring to FIG. 1 there is shown an air conditioning system 10 for an aircraft, the system 10 being of the closed loop kind in which a working fluid is continuously re-circulated and used to cool a heat load such as the air in an aircraft cabin, or the air in an environment including a heat load such as an avionics system of the aircraft, or otherwise.

Figure 5:
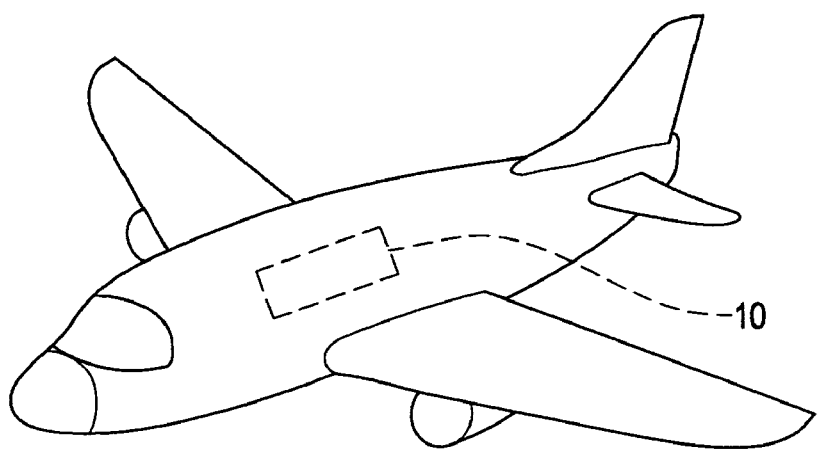
FIG. 5 is an illustrative view of an aircraft having the air conditioning system.

FIG. 5 illustrates an aircraft having the air conditioning system of FIG. 1.

According to the invention, a first heat load is cooled in a first heat load heat exchanger 12, whilst a second heat load is cooled in a second heat load heat exchanger 14. Either or both of the heat loads may for example be aircraft cabin air, air from an environment in which an aircraft avionics system is provided, or a coolant which is provided to cool an aircraft system such as an avionics system.

The re-circulating working fluid of the system 10, which fluid conveniently is air but may be another fluid, is compressed in a compressor stage 15 of the system 10 which includes in the FIG. 1 example, a first compressor 16 which is driven by a power drive such as an electric motor 18 via a shaft 17, a second compressor 19 which is carried on a shaft 20 which may be electrically or otherwise power driven e.g. by a motor as indicated at 21 in dotted lines in the figure, or, as indicted by the full lines in the example of FIG. 1, driven on the shaft 20 by a turbine 30 which will be referred to below. The compressor stage 15 further includes a third compressor 22 carried on another shaft 23 on which another turbine 29 is driven.

The working fluid is thus compressed in stages by the three compressors 16, 19 and 22, thus becoming hot as the fluid is compressed.

The hot compressed working fluid is cooled in an intercooler 24 which is in this example, a heat exchanger through which ambient (cooler) air is constrained to flow, the hotter compressed working fluid thus exchanging heat to the ambient air. The ambient air may, when the aircraft is in ordinary flight, be so called "ram" air which passes through the intercooler 24 as a result of the motion of the aircraft through the air, but such airflow may be assisted, or caused when the aircraft is not flying e.g. on the ground, by a fan 26.

Conveniently any such fan 26 may be driven by an electric motor, but alternatively, as illustrated in dotted lines in FIG. 1, in an alternative arrangement, the fan 26 may be carried on the shaft 23 on which the turbine 29 is provided, in which case the third compressor 22 may be power driven.

The compressed working fluid which has been cooled in the intercooler 24 thus passes to a first turbine, i.e. turbine 29 carried on the shaft 23 on which the third compressor 22 or the fan 26 is carried, and thus the compressed working fluid is expanded and cooled over the first turbine 29 before passing to the first heat load heat exchanger 12. In the first heat load heat exchanger 12, the working fluid acts as a coolant to cool the first heat load, which may in this example be cabin air which is re-circulated to the cabin after cooling.

The warmed working fluid from the first heat load heat exchanger 12 then passes to a second turbine 30, i.e. the turbine 30 carried on the shaft 20 on which the second compressor 19 is carried, the working fluid thus being further expanded and cooled. The further expanded and cooled working fluid then passes to the second heat load heat exchanger 14 where the working fluid acts as a coolant to cool a second heat load such as air or another coolant from an avionics system of the aircraft which generally generates more heat that the first heat load.

The working fluid is then re-circulated to the first compressor 16 and so on continuously while the system 10 is in use.

As desired, the system 10 may include more than the two heat load heat exchangers in the working fluid circulation closed loop to cool further heat loads, the working fluid being cooled for providing cooling in each such further heat load heat exchanger, by a respective expansion turbine which may have a counterpart compressor, power driven or driven by a turbine through a drive shaft.

Desirably the second heat load heat exchanger 14, and the first and second compressors 16, 19 in the FIG. 1 embodiment, may be isolated in the system 10 by a valve arrangement such as shown at 33, 34 for maximum efficiency. When the valve 33 is closed, working fluid may not pass from the second compressor 19 to the third compressor 22, whilst with the valve 34 open, compressed working fluid from the second compressor 19 may pass directly to the second expansion turbine 30 and hence to the second heat load heat exchanger 14, thus by-passing the first heat load heat exchanger 12, and the intercooler 24, and the first expansion turbine 29.

Thus for example where cooling of the first heat load is not required, the load heat exchanger 12 may be by-passed. Also the intercooler will be by-passed and so even after expansion over the turbine 30, the air will still be sufficiently warm to provide heating rather than cooling of the heat load in load heat exchanger 14, where this is required.

Even though the system 10 is a closed loop system 10, working fluid may be lost from the system, which loss may be made up by introducing working fluid from an inlet indicated at A although this may be provided elsewhere in the system 10.

Figure 2:
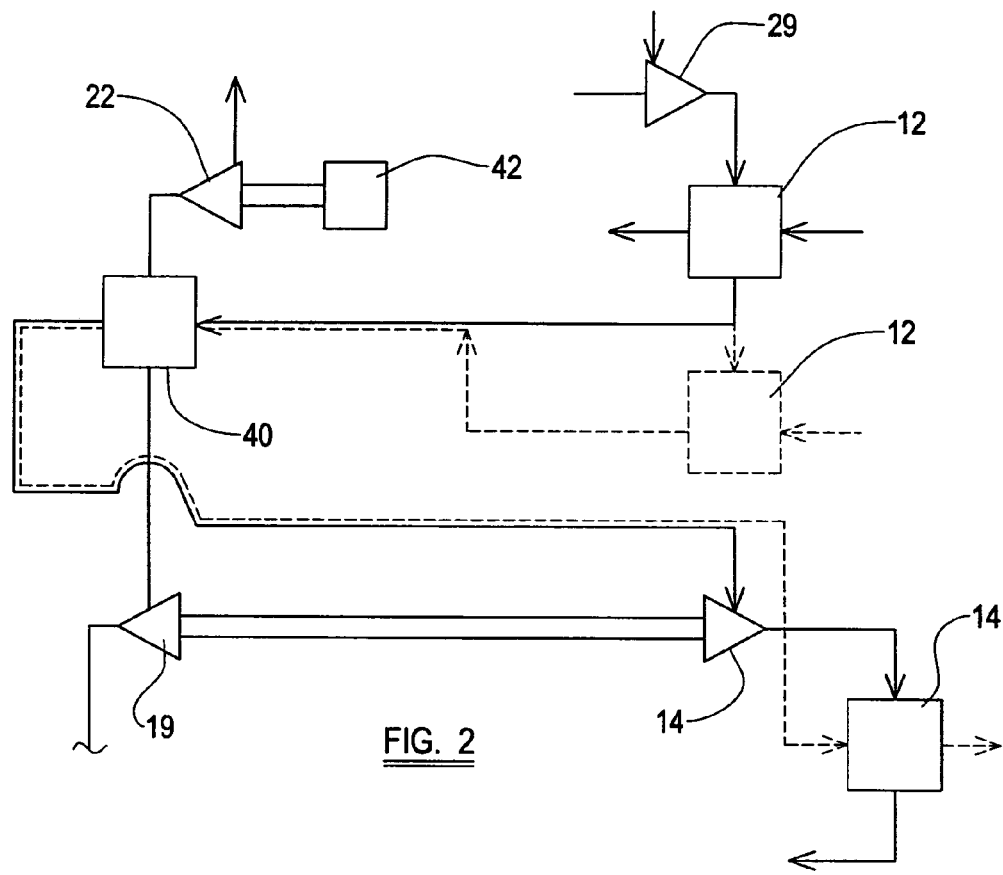
FIG. 2 is a diagrammatic illustration of part of the FIG. 1 system, but illustrating modifications.

Referring now to FIG. 2, the system is FIG. 1 has been modified by the provision of an intermediate heat exchanger 40 in the compressor stage 15 of the system 10 between the second and third compressors 19, 22. The working fluid which has been compressed and thus heated by the second compressor 19 is cooled in the intermediate heat exchanger 40 prior to being passed to the third compressor 22 (which may be electrically driven by a motor as indicated at 42.

Coolant for the intermediate heat exchanger 40 is provided by working fluid which has been expanded and cooled over the first expansion turbine 29 and already used as coolant in the first heat load heat exchanger 12. After cooling the hot compressed working fluid in the intermediate heat load heat exchanger 40, the working fluid may be passed directly to the second expansion turbine 14 and hence to the second heat load heat exchanger 14 and thereafter recirculated.

Alternatively, coolant for the intermediate heat exchanger 40 may be provided by load air e.g. from the aircraft cabin or the environment of an avionics system as indicated by the dotted lines in the figure, which load air has been cooled in the first heat load heat exchanger 12 by the cooled and expanded working fluid from the first expansion turbine 29. In this case, after cooling the hot compressed working fluid in the intermediate heat exchanger 40, the load air may be recirculated to the cabin or avionics environment, directly or preferably via the second heat load heat exchanger 14, as desired, an again, as indicated in dotted lines in the figure.

In the embodiment of FIG. 2, as the working fluid is cooled in-between compressors 19, 22 of the compressor stage 15, the intercooler 24 may not be required. Of course, if desired, the intermediate heat exchanger 40 could be located elsewhere in the compressor stage 15, for example to cool the working fluid between the first 16 and second 19 compressors.

Figure 3:
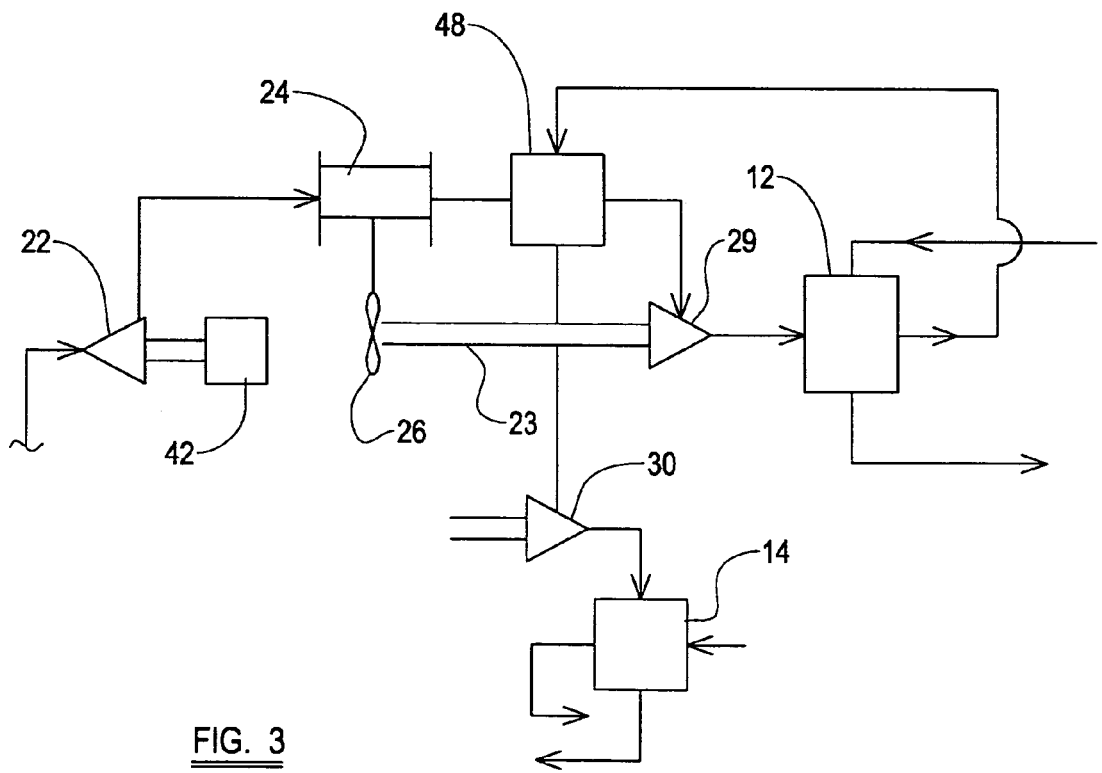
FIG. 3 is a diagrammatic illustration of another part of the FIG. 1 system but showing another modification.

In FIG. 3 another modification to the system 10 of FIG. 1 is illustrated. In this example a regenerative heat exchanger 48 is provided in series with the intercooler 24 to cool the hot compressed working fluid prior to expansion and cooling. Coolant for the regenerative heat exchanger 48 is provided by working fluid from the first expansion turbine 29 subsequent to the coolant acting as such in the first heat load heat exchanger 12. Subsequent to cooling the hot compressed working fluid in the regenerative heat exchanger 48, the coolant working fluid is provided to the second expansion turbine 30, and hence to the second heat load heat exchanger 14, and then for re-circulation.

In the modified embodiment of FIG. 3, the third compressor 22, or at least the final compressor of the compressor stage 15, is electrically driven by a motor 42, and the shaft 23 on which the first expansion turbine 29 is provided, drives a fan 26 inducing an airflow into the intercooler 24.

Figure 4:
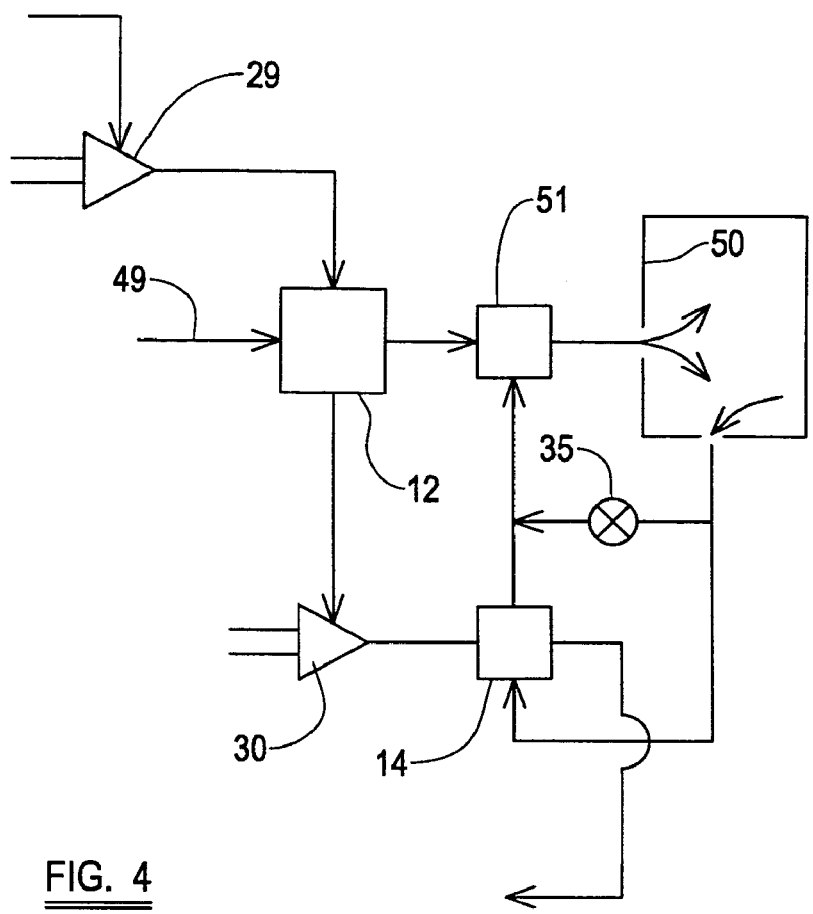
FIG. 4 is a diagrammatic illustration of part of the FIG. 1 system by illustrating a yet further modification.

Referring now to FIG. 4, the first heat load heat exchanger 12, instead of being provided to cool load air, cools fresh supply air supplied from an inlet 49. This is achieved as expanded and cooled working air from the first expansion turbine 29 acts as a coolant in the first heat load heat exchanger 12 before passing to the second expansion turbine 30, and hence to the second heat load heat exchanger 14 and then for re-circulation. The second heat load which is cooled in the second heat load heat exchanger 14 is re-circulating cabin air from an aircraft cabin 50. The re-circulating, thus cooled, cabin air is provided to a mixing box 51 where it is mixed with supply air which has passed through the first heat load heat exchanger 12, and the thus mixed air is then passed to the aircraft cabin 50 as indicated.

The proportions in which the fresh supply air and re-circulating cabin air flows are mixed may be varied as desired to achieve a desired cabin 50 temperature and to ensure the provision of a minimum volume of fresh air. Excess air will need to be discarded, to atmosphere for example.

By virtue of the present invention, a closed loop air conditioning system may be provided which utilises well established turbomachinery technology but which is able to benefit from the advantages of an electrically driven system.

Of course, any desired arrangement of control valves and by-pass ducts may be provided to enable close control of the system by a suitable controller, e.g. according to a control algorithm, to achieve a system which is efficiently operated and able to provide a desirable degree of air conditioning to suit varying ambient conditions e.g. as the altitude of the aircraft rises and falls. For example in FIG. 4, a valve 35 is shown which may be opened to allow cabin air to pass directly to the mixing box 51 for mixing with cooled fresh supply air rather than passing through the second heat load heat exchanger 14.

The invention claimed is:

1. A closed loop air conditioning system for an aircraft, the system including a compressor stage including at least one power driven compressor, for compressing working fluid, a first expansion turbine over which compressed working fluid is expanded and cooled, a first heat load heat exchanger in which heat from a first heat load is exchanged to the expanded and cooled working fluid, a second expansion turbine over which working fluid from the first heat exchanger is further expanded and cooled, and a second heat load heat exchanger in which heat from a second heat load is exchanged to the further expanded and cooled working fluid.

2. A system according to claim 1 wherein the power driven compressor is electrically driven by a motor.

3. A system according to claim 1 wherein the compressor stage is a single compressor.

4. A system according to claim 1 wherein the compressor stage includes multiple compressors, one of the compressors being driven by the rotation of the first expansion turbine or the second expansion turbine.

5. A system according to claim 1 wherein an intercooler for cooling compressed working fluid prior to its expansion, is provided.

6. A system according to claim 5 wherein the intercooler includes a heat exchanger through which ambient air is constrained to pass to cool the hot compressed working fluid.

7. A system according to claim 6 wherein the ambient air is ram air which passes through the heat exchanger as a result of movement of the aircraft through the air.

8. A system according to claim 6 wherein the intercooler includes a fan which is driven to draw air or force air through the intercooler heat exchanger to cool the hot compressed working fluid, so that the ambient air is constrained to flow through the heat exchanger.

9. A system according to claim 8 wherein the fan is one of electrically driven and carried on a shaft with which the first expansion turbine over which the compressed working fluid is expanded and cooled, rotates.

10. A system according to claim 1 wherein the system includes a by-pass valve arrangement which is operative to permit at least a proportion of the hot compressed working fluid from the compressor stage to by-pass the first heat exchanger and pass directly to the second expansion turbine as required.

11. A system according to claim 4 wherein the system includes an intermediate heat exchanger between two compressors for cooling compressed working fluid in the compressor stage prior to its final compression.

12. A system according to claim 11 wherein the or an upstream compressor is carried on a shaft with which the second expansion turbine over which the compressed working fluid is expanded and cooled, rotates, and the or a downstream compressor is the power driven compressor.

13. A system according to claim 11 wherein coolant for the intermediate heat exchanger, to which heat is exchanged from the compressed working fluid, is working fluid which has been expanded and cooled by the first expansion turbine.

14. A system according to claim 13 wherein the working fluid from the first expansion turbine first cools the first heat load in the first heat load heat exchanger before being used as coolant in the intermediate heat exchanger.

15. A system according to claim 14 wherein the coolant from the intermediate heat exchanger is subsequently passed to the second expansion turbine for further expansion and cooling.

16. A system according to claim 11 wherein coolant for the intermediate heat exchanger, to which heat is exchanged from the compressed working fluid, is heat load air from an aircraft cabin or avionics environment.

17. A system according to claim 16 wherein heat is exchanged from the compressed working fluid after cooling in first heat exchanger so that the heat load air is cooler than the compressed working fluid.

18. A system according to claim 16 wherein after being used as a coolant in the intermediate heat exchanger, the heat load air is recirculated to the aircraft cabin or avionics environment.

19. A system according to claim 18 wherein the heat load air is recirculated after being cooled downstream of the second expansion turbine as a second heat load, in the second heat load heat exchanger.

20. A system according to claim 11 wherein coolant for the intermediate heat exchanger, to which heat is exchanged from the compressed working fluid, is be ambient air which has been cooled in first heat exchanger.

21. A system according to claim 5 wherein the system includes in series with the intercooler, a regenerative heat exchanger to which a coolant is supplied further to cool the compressed working fluid which has been cooled in the intercooler, from the first expansion turbine, prior to the working fluid passing to the second expansion turbine for further expanding and cooling.

22. A system according to claim 21 wherein prior to being used as a coolant in the regenerative heat exchanger, the working fluid from the first expansion turbine is used as a coolant in the first heat load heat exchanger.

23. A system according to claim 1 wherein where it is desirable to mix with re-circulating cabin air a proportion of fresh supply air, the supply air is the first heat load which is cooled in the first heat load heat exchanger, and which is then mixed with re-circulating cabin air, the cabin air, prior to mixing with the supply air, being a second heat load which is cooled in the second heat load heat exchanger by the working fluid from the second expansion turbine.

24. An aircraft having a closed loop air conditioning system, the system including a compressor stage including at least one power driven compressor, for compressing working fluid, a first expansion turbine over which compressed working fluid is expanded and cooled, a first heat load heat exchanger in which heat from a first heat load is exchanged to the expanded and cooled working fluid, a second expansion turbine over which working fluid from the first heat exchanger is further expanded and cooled, and a second heat load heat exchanger in which heat from a second heat load is exchanged to the further expanded and cooled working fluid.

* * * * *